(12) United States Patent  
Panin

(10) Patent No.: US 8,903,991 B1
(45) Date of Patent: Dec. 2, 2014

(54) CLUSTERED COMPUTER SYSTEM USING ARP PROTOCOL TO IDENTIFY CONNECTIVITY ISSUES

(75) Inventor: Nikolay Panin, Saint Petersburg (RU)

(73) Assignee: EMC Corporation, Hopkinton, MA (US)

( * ) Notice: Subject to any disclaimer, the term of this patent is extended or adjusted under 35 U.S.C. 154(b) by 459 days.

(21) Appl. No.: 13/334,506

(22) Filed: Dec. 22, 2011

(51) Int. Cl.
*G06F 15/173* (2006.01)

(52) U.S. Cl.
USPC .......................................................... 709/224

(58) Field of Classification Search
None
See application file for complete search history.

(56) References Cited

U.S. PATENT DOCUMENTS

| | | | |
|---|---|---|---|
| 6,981,034 B2 * | 12/2005 | Ding et al. ................. | 709/223 |
| 7,051,087 B1 * | 5/2006 | Bahl et al. .................. | 709/220 |
| 7,676,587 B2 * | 3/2010 | Faibish et al. .............. | 709/230 |
| 8,325,676 B2 * | 12/2012 | Chen et al. ................. | 370/331 |
| 2002/0032766 A1 * | 3/2002 | Xu ............................. | 709/223 |
| 2002/0032797 A1 * | 3/2002 | Xu ............................. | 709/238 |
| 2002/0032798 A1 * | 3/2002 | Xu ............................. | 709/238 |
| 2002/0035639 A1 * | 3/2002 | Xu ............................. | 709/238 |
| 2002/0038339 A1 * | 3/2002 | Xu ............................. | 709/203 |
| 2006/0129695 A1 * | 6/2006 | Faibish et al. .............. | 709/245 |
| 2006/0149840 A1 * | 7/2006 | Thompson et al. ......... | 709/224 |
| 2006/0224774 A1 * | 10/2006 | Tanji .......................... | 709/245 |
| 2008/0313314 A1 * | 12/2008 | Lobig et al. ................ | 709/222 |

OTHER PUBLICATIONS

"Address Resolution Protocol (ARP)," from Wikipedia, downloaded Apr. 12, 2012 from en.wikipedia.org, last modified Mar. 20, 2012.
"High-availability cluster (HA cluster)," from Wikipedia, downloaded Apr. 12, 2012 from en.wikipedia.org, last modified Apr. 6, 2012.

* cited by examiner

*Primary Examiner* — Brian P Whipple
(74) *Attorney, Agent, or Firm* — BainwoodHuang

(57) ABSTRACT

A secondary computer tests local network connectivity in assuming responsibility from a primary computer for a network service. The secondary computer issues an address resolution protocol (ARP) command on a network interface and monitors for an expected ARP response. The ARP command is a broadcast command including a network address of a gateway between a local network segment and external network(s). If the expected response is received (which includes the gateway network address and data-link-layer address), correct connectivity is confirmed. Otherwise there is a potential problem with the connectivity. For example, a switch providing layer-2 message forwarding may be improperly configured so that the secondary computer is erroneously not connected to the same network segment as the gateway, making it impossible for the secondary computer to use the gateway for service communications. The secondary computer initiates a remedial action such as investigating and/or repairing the potential connectivity problem.

14 Claims, 3 Drawing Sheets

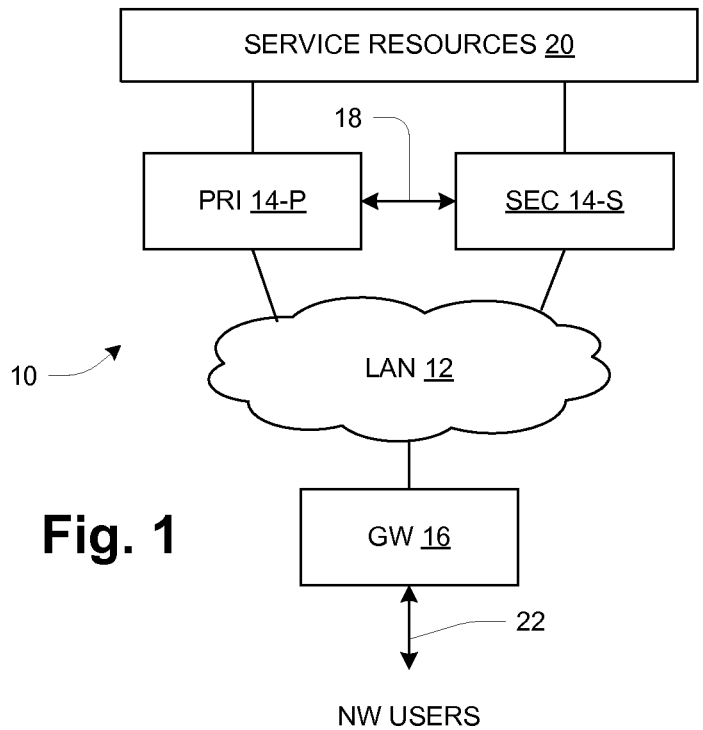
Fig. 1
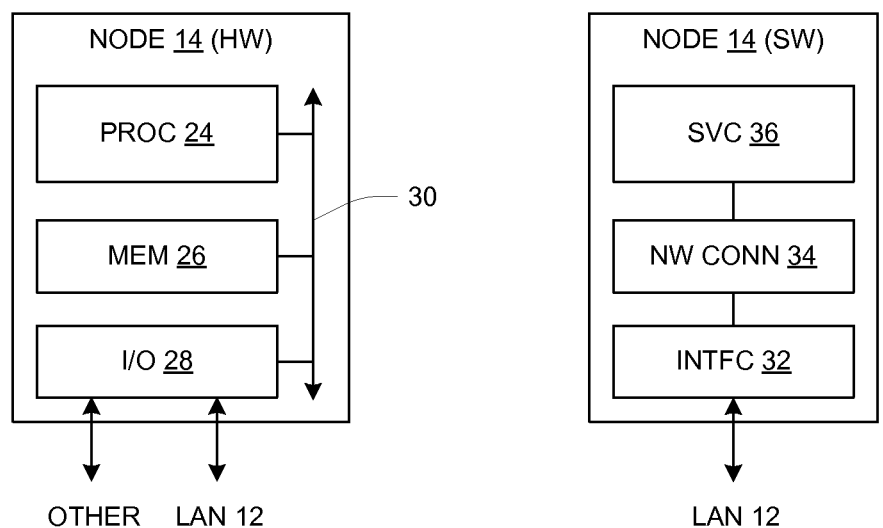
Fig. 2
Fig. 3

CLUSTERED COMPUTER SYSTEM USING ARP PROTOCOL TO IDENTIFY CONNECTIVITY ISSUES

BACKGROUND

Services in computer networks may be provided using a collection or "cluster" of computers, for example to support a large number of users and the accompanying high rates of service communications and operations or to provide extra resistance to malfunctions and reliability of service. A clustered set of computers is typically interconnected by a private network having one or more attached gateway devices providing path(s) to external network(s) to which the users of the service are connected. Such external networks may include the public internet, for example. The private network may be constructed and organized using any of a variety of network technologies, including one or more local area networks (LANs). A LAN may include a collection of switches that operate to receive and forward network traffic at a data link layer, or layer 2, of network operation according to well-known OSI model. The clustered system typically interacts with the external network(s) at a network layer, or layer 3, of network operation, which includes use of specialized devices and protocols providing message routing across wider areas and arbitrary connection topologies.

SUMMARY

In a clustered computer system, there can be a need for transfer or "migration" of a service from one computer, or node, to another. For example, in so-called "high availability" systems, it may be necessary to meet very stringent limits on any service disruptions. Thus in high availability systems, migration can be used for purposes of dynamic failover, meaning that a secondary node very quickly begins performing the service operations when a primary node that has been providing the service fails.

Network services are often associated with a particular network address used by the system for service communications with the users, who are located in the external network(s). This aspect of service should not change due to a local event such as failover. This means that the secondary node uses the same network address as has the primary node for service communications. However, operation within the private network will necessarily change due to the migration of the service from one node to another. In particular, service-associated communications must be sent to the secondary node instead of the primary node after a failover has occurred. When the private network includes a LAN or other layer-2 network segment, operation after the failover will be based on a new association of the service network address with a layer-2 address of the secondary node that is now providing the service. It might be assumed that the secondary node has proper layer-2 connectivity to the gateway and other nodes of the private network. However, such an assumption may not be well founded. It may be that the secondary node had not been involved in network communications prior to the failover, and thus a connectivity problem might exist and have gone undetected. In this scenario, the failover will likely result in a significant service disruption as the secondary computer cannot communicate with the external users.

A method is disclosed of operating a secondary computer in a networked system providing a network service, where the system uses a set of computers including the secondary computer and a primary computer and includes a local network segment connected to a gateway via which users of the network service communicate with the system. Upon assuming responsibility from the primary computer for providing the network service, the secondary computer issues an address resolution protocol (ARP) command on a network interface of the secondary computer. The ARP command is a broadcast command including a network address of the gateway. The interface is one which is believed to be connected to a network segment to which the gateway is also connected, in which case the gateway normally responds.

The secondary computer monitors for receipt of an expected response to the ARP command, where the expected response includes the network address of the gateway as well as a data-link-layer address of the gateway on the network segment. Receipt of the expected response indicates that the local network segment is properly configured to enable the secondary computer to reach the gateway, and thus the secondary computer can initiate its operation of the service on this basis. If the secondary computer does not receive the expected response to the ARP command, it is an indication of a potential problem with the connectivity of the network segment. For example, a switch providing layer-2 message forwarding may be improperly configured so that the secondary computer is erroneously not connected to the same network segment as the gateway. In such an event, the secondary computer initiates a remedial action that generally will include investigating and/or repairing the potential non-connection of the secondary computer to the local network segment. This may involve sending an alert message to an administrative user, who can take immediate action to examine the configuration of the switches or other devices on the local network segment and take corrective action as necessary.

The disclosed technique can be used in a system using virtualization technology. For example, the computers may be serving as hosts each supporting one or more virtual machines in which the application program(s) of the service are executing. In some Linux systems, such virtual machines are referred to as "containers". Migration may involve transferring a container from the primary node to the secondary node. The above procedure can be used before the secondary node begins using the service-associated network address, to ensure that the network connectivity of the new host will support the service-associated communications.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a block diagram of a computer system;

FIG. 2 is a block diagram of a computer or node from a hardware perspective;

FIG. 3 is a block diagram of a computer or node from a functional or software perspective;

DETAILED DESCRIPTION

Figure 4:
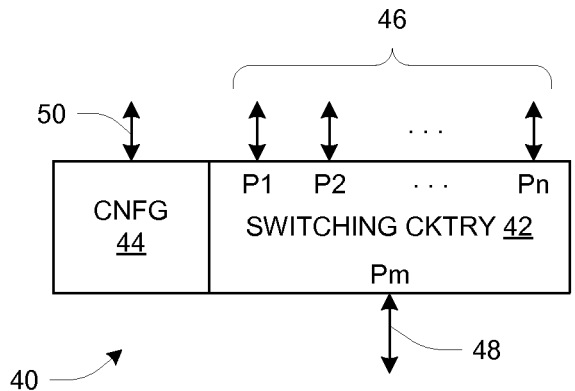
FIG. 4 is a schematic diagram of a switch.

FIG. 1 shows a computer system 10 used to provide service(s) to network users. The system includes a local area network (LAN) 12 interconnecting a set of nodes 14 (shown as a primary node PRI 14-P and secondary node SEC 14-S) and a gateway (GW) 16. The nodes 14 are computers, typically having conventional hardware content and organization with customized software executed by the hardware to realize functionality as described herein. The nodes 14 may employ an inter-node communications link 18. They also have interfaces to service resources 20, such as a set of storage devices for example, used to provide the services. The services provided by the system may include storage-oriented services, such as network attached storage (NAS), which typically includes functionality of a network file system visible to and used by the network users. The gateway 16 provides network-oriented functionality including network-layer routing, typically along with higher level functions such as a firewall and other security features. As shown, the gateway 16 has one or more connections 22 to external network(s) via which the external users (NW USERS) access the service(s), which in general will include public and/or private wider-area network(s).

For ease of description and without loss of generality, the remaining description refers to a single service provided by the system 10. It will be appreciated that the disclosed techniques apply equally to systems providing more than one service.

In the system of FIG. 1, nodes 14 are responsible for providing the network service in response to service requests received via the gateway 16 and LAN 12. The requests, responses and other service-related communications are carried via logical connections defined at computers participating in the service(s). For example, the system 10 may be viewed as a point at which the service is delivered or accessed, and the nodes 14 provide a service-end termination of logical connections of the service, while user-end terminations of these connections are typically at user machines outside the system 10 and reachable via the gateway 16. The connections may be in the form of TCP/IP connections for example. Traffic for these logical connections is routed from a user machine to one of the nodes 14 via external network routers (not shown) and the gateway 16. Routing functionality occurs at a network layer (or layer 3) in OSI model of network operations. Network-layer actors have network addresses such as IP addresses that are used for routing purposes. References herein to IP addresses should be understood as applying to network-layer addresses in general unless context dictates that a more specific meaning is intended.

Within the system 10, network traffic is carried by the LAN 12, which is assumed to operate at the data link layer (or layer 2) in the OSI model of network operation. One common form of LAN uses Ethernet technology and MAC (media access control) addresses to identify nodes at the data link layer. References to MAC addresses should be understood as applying to data link layer addresses in general unless context dictates a more specific meaning. The term "interface" is used to describe a connection to a data link as seen by a network-layer component. In the system 10, incoming network traffic is received by the gateway 16, which ascertains the identity of the local destination node 14 and forwards the traffic to the destination node 14 via the LAN 12 using the MAC address of the node 14. The nodes 14 operate slightly differently, as they are originators of traffic and they often utilize configured "default gateway" information identifying a gateway to which their externally directed network traffic is to be sent. Thus, externally directed network traffic initiated by the nodes 14 is simply sent to the gateway 16 via the LAN 12 using the MAC address of the gateway 16.

Either the gateway 16 or in some cases a separate component can provide support for network management functions within the system 10. These functions can include a variety of configuration functions. Examples are discussed below. The support may include either a local connection (e.g., a dedicated Ethernet or USB connection) or a remote connection (e.g., logical connection via gateway 16 and external network) to a remote network management station. One important configuration function is to configure the equipment that constitutes the LAN 12 so that it provides the desired connectivity among the nodes 14 and gateway 16. This is discussed in more detail below.

The system 10 provides a degree of system-level redundancy for greater availability. In the absence of failures, the primary node 14-P executes a service application program that provides the service to the remote users. Operation may include receiving a request from a remote user via the gateway 16 and LAN 12, performing local operations for the request (generally involving access to the service resources 20), then creating a response and returning it to the remote user via the LAN 12 and gateway 16. The service is assumed to be associated with a public network address (i.e., a network address known to the user machines and routable in external networks) as specifying the system 10 as providing the service. This may be achieved through use of the DNS system, for example. During normal operation, the gateway 16 identifies the primary node 14-P as the origination and termination point for network communications using this network address.

In the above situation the secondary node 14-S is idle with respect to the service—it does not process service requests. Its function is to be available to assume responsibility for providing the service in the event that the primary node 14-P fails. Thus part of the normal operation of node 14-S may be to monitor for circumstances indicating that it should begin providing the service. This may involve a low-rate communications exchange with the primary node 14-P via the communication link 18. This communications may include exchange of signaling messages at regular intervals, a mechanism often referred to as a "heartbeat". When the secondary node 14-S stops receiving such signaling messages, it concludes that the primary node 14-P has failed and assumes responsibility for providing the service.

One aspect of assuming responsibility for the service is to take over as the endpoint for the service traffic carried on the service connections. To do so, the secondary node 14-S must being responding to incoming service requests that are directed to the network address associated with the service. Prior to failing, the primary node 14 had the sole responsibility for responding to service communications directed to that network address. Upon a failure, this responsibility passes to the secondary node 14-S. As explained below, this transfer of responsibility requires that the secondary node 14-S have proper connectivity to the LAN 12. However, because the secondary node 14-S has been idle and not involved with the service network traffic, there is a possibility that there is a problem with LAN connectivity that has gone undetected. Described below is a technique usable to detect such problems so that action can be taken to either avoid or promptly remedy them, limiting the duration of any transitory interruption in the availability of the service due to the failure of the primary node 14-P.

FIG. 2 shows a block diagram of a node 14 from a hardware (HW) perspective. The node 14 includes computer program instruction processing circuitry (PROC) 24, memory (MEM) 26, input/output circuitry (I/O) 28 and one or more data busses 30 interconnecting these components for data transfer among them. The memory 26 is typically semiconductor memory and includes both non-volatile memory as well as volatile or working memory. The I/O circuitry 28 includes hardware network interface circuitry, such as Ethernet interface circuitry etc., providing the physical-layer (layer 1) hardware interface to the LAN 12. The I/O circuitry 28 may also include specialized hardware interface(s) to the service resources 20. In the case of storage-oriented service resources 20 such as disk drives, these interfaces may include storage-oriented interconnect interfaces such as Fiber Channel interfaces, etc.

FIG. 3 presents an organization of the node 14 from a functional or software (SW) perspective, where it is understood that the functions are generally realized as operation of the node hardware (FIG. 2) under control of corresponding computer programs or software. These include a communications interface (INTFC) 32, a network function (NW CONN) 34, and software including one or more service application programs (SVC) 36. The service application program(s) 36 use the network function 34, which in turn uses the communications interface 32, to carry out communications with the external users. In particular, the communications interface 32 provides a data link layer termination of traffic of the LAN 12 and has a unique data link layer network address (e.g., MAC address). The communications interface 32 includes the above-discussed hardware network interface circuitry. The network function 34 provides the local termination of the above-discussed logical connections used by the service 36 to communicate with remote users. The network function 34 has its own network layer (e.g., IP) address, which becomes known to the service users as the network address of the service as described above. From the perspective of the network function 34, the communications interface 32 is an interface to a network "segment" or layer-2 communications link that carries layer-3 network traffic as a payload to a peer layer-3 component such as the gateway 16. From this perspective, the LAN 12 itself can be viewed as a "network segment" and is referred to as such herein.

FIG. 4 illustrates a network switch 40 used for routing traffic within the LAN 12. A small LAN 12 may employ only one switch, whereas a larger LAN may use a set of interconnected switches. The switch 40 includes switching circuitry (SWITCHING CKTRY) 42 and configuration circuitry (CNFG) 44. The switching circuitry 42 has a set of external connection points shown as ports Px. The ports are connected to respective network links, shown as local links 46 and an uplink 48. The links 46 may be connections to respective nodes 14, while the uplink 48 is a connection to the gateway 16 for example. The configuration circuitry 44 has a connection 50 (which may be logical) to a separate station for management or administration such as described above with respect to the gateway 16.

As generally known in the art, the switch 40 provides high-speed forwarding of data link layer messages, such as Ethernet frames, among the ports Px. The messages will include the data link layer address of the desired recipient within the LAN 12. Thus an outbound message will include the MAC address of the gateway 16 for example, while an inbound message for the service 28 will include the MAC address of the primary node 14-P during normal system operation (i.e., when node 14-P is functioning and providing the service). The switching circuitry 42 forwards messages to the correct ports based on their respective destination MAC addresses. Another function provided by the switching circuitry 42 is "broadcast", i.e., the forwarding of a broadcast-type message received at one port to multiple other ports of the switch 40. Some network functions utilize broadcast functionality for particular purposes. One specific example is the Address Resolution Protocol or ARP, which uses broadcast in a particular manner as described below.

The switching circuitry 42 becomes configured for proper operation by a system administrator via the connection 50 and configuration circuitry 44. A variety of operational parameters may be subject to configuration. In the present context, one type of configuration of interest is the assignment of MAC addresses to the ports Px. The switching circuitry 42 is configured with a set of associations between the ports Px and the MAC addresses of the network endpoints (nodes 14, gateway 16) connected to the ports. In the simplified depiction of FIG. 1, it is assumed that the associations are one-to-one. Each port Px of the switch 40 is associated with one MAC address, that of the node 14 or gateway 16 to which that port Px is connected. In operation, the switching circuitry 42 consults the set of associations to find the port associated with the MAC address appearing in a received message, then forwards the message to that port for transmission on the respective link 46, 48. In the case of a message to be broadcast on the LAN 12, the switching circuitry 42 sends a copy of a received message to all ports Px connected to members of the LAN 12. Thus another aspect of configuration is to associate ports Px with particular LANs, enabling the switch 40 to support multiple distinct LANs for example.

Some intelligent and advanced switches can be configured to route packets based on set of rules that include not only information provided by layer-2, but also information provided by layer-3 and above. With more configuration possibilities, it is possible for the switch 40 to be improperly configured in a way that can cause an interruption of the service provided by the system at the time of a failover.

As one example of improper configuration, a particular switch port Px may be configured to route packets to some other network segment, not to the segment to which the gateway 16 is connected. Alternatively, in the case of multiple interconnected switches in the LAN 12, the network interface INTFC 32 may be connected to the wrong switch, for example a switch configured with incorrect routing rules or even to drop all packets not directed to predefined network segments. There is also a possibility of hardware malfunction in the link between switch port Px and the secondary node 14-S. Possible malfunctions include one that allows connectivity on layer-1, but prevent connectivity on upper levels.

Such an improper configuration could go unnoticed during normal operation, because during that time the secondary node 14-S does not need to respond to network traffic of the service. But once the secondary node 14-S assumes responsibility for the service, it must begin responding to network traffic as soon as possible to minimize disruption. If there is a problem with network connectively, it will adversely affect system operation at this critical time.

Figure 5:
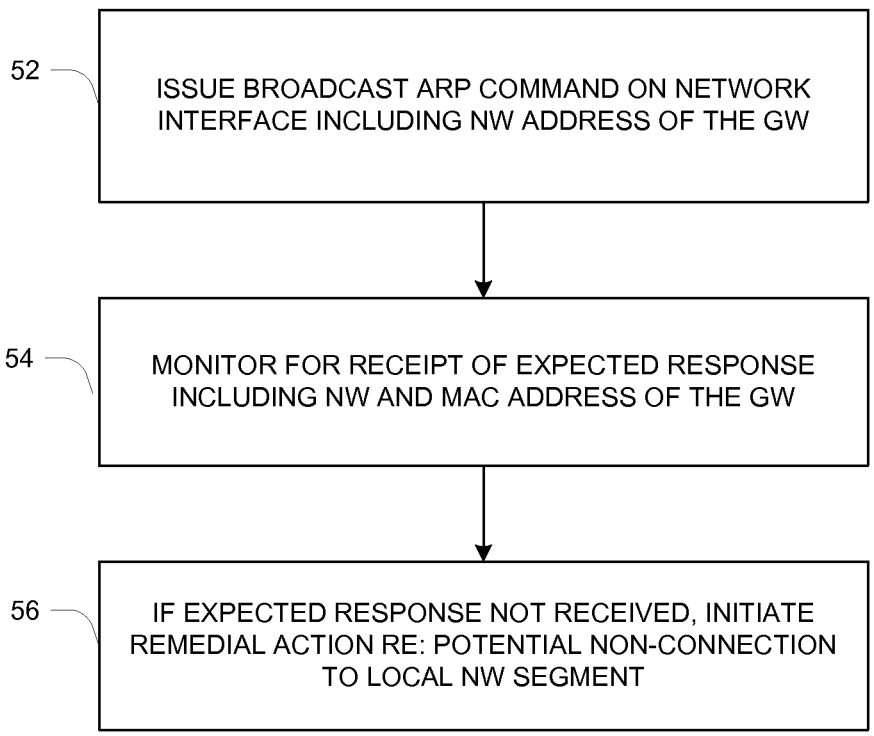
FIG. 5 is a flow diagram of a procedure for testing local network connectivity.

FIG. 5 describes a procedure that can be used to detect a network connectivity problem of the type described above. This procedure can be performed by a network node such as the secondary node 14-S to ascertain whether it has connectivity to the gateway through which service traffic is routed (e.g., gateway 16). If so, there is an increased confidence that a service transition will occur more smoothly than if such connectivity is not present. The procedure employs a technique referred to as "ARP ping", i.e., "pinging" the gateway 16 using an ARP command. Here "pinging" refers to sending a message that normally evokes a response, and using the response to gather information about the connection between the two nodes involved in the ping exchange. Pinging can be done in a variety of way. Use of ARP may be particularly effective, because in LANs that support ARP the nodes are typically required to respond (this rule must be in place if ARP is to function correctly). Thus, if a node issues an ARP command directed to a given network address, if no response is received then it is likely that the issuing node has no connection to a node using that network address.

At 52, the secondary node 14-S issues an address resolution protocol (ARP) command on a network interface 24 of the secondary node 14-S. The ARP command is a broadcast command and is directed to the network address of the gateway 16. The secondary node 14-S has been configured with this address as its default route, for example.

At 54, the secondary node 14-S monitors for receipt of an expected response to the ARP command. In this case, the expected response would include the network address as well as the MAC address of the gateway 16. If this response is received, then it can be concluded that the secondary node 14-S is correctly connected to the LAN 12 and can receive and transmit the service network traffic.

At 56, in the event that the secondary node 14-S does not receive the expected response to the ARP command, it initiates some kind of remedial action to address what may be a connectivity problem, e.g., the secondary node 14-S is not connected to the LAN 12 due to improper configuration of the switch 40. The remedial action may include investigating the issue and taking appropriate corrective action, such as re-configuring the switch 40 to the correct configuration which establishes connectivity between the secondary node 14-S and the LAN 12 including gateway 16. The secondary node 14-S may initiate such action by issuing a notification message to a system administrator, for example. In this case it is assumed that the secondary node 14-S has a separate communications mechanism for sending such a notification, such as its own dedicated administrative connection (not shown) to a management station.

Figure 6:
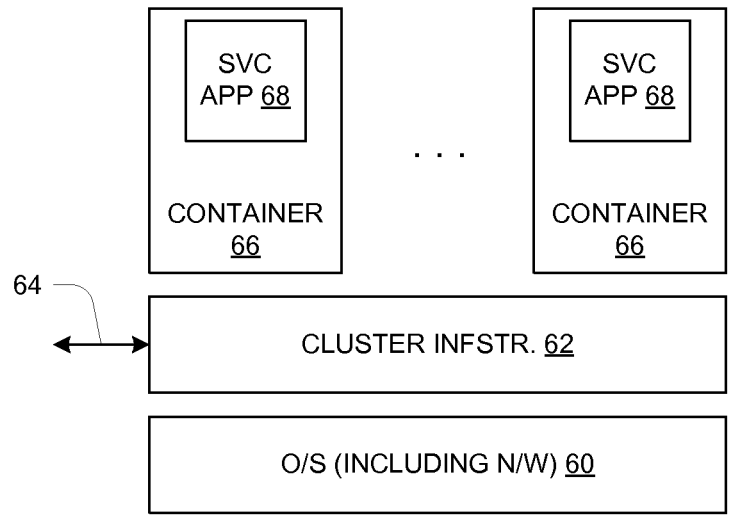
FIG. 6 is a schematic diagram of a host computer having virtualization and cluster infrastructure components.
Figure 7:
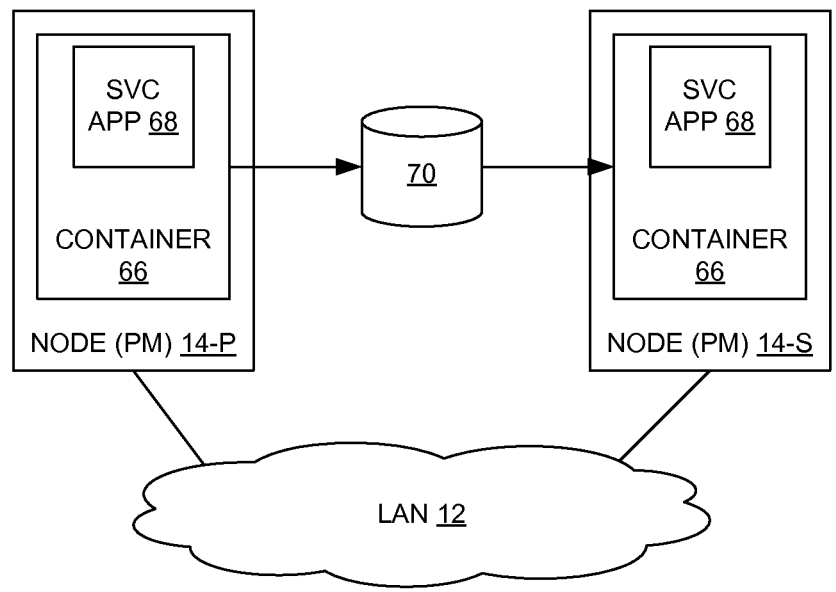
FIG. 7 is a block diagram of a computer system using nodes of the type shown in FIG. 6.

FIGS. 6 and 7 illustrate one specific application of the general techniques described above. In this case, the service is a storage-oriented service provided by a cluster of nodes 14 each organized according to FIG. 6. The system may be of the type referred to as "high availability", meaning that it has significantly higher operational availability than other kinds of systems. The system organization includes use of so-called "virtualization" techniques using functionality of one or more "virtual machines" to enhance availability as well as other aspects of system performance.

In the illustrated arrangement, the node 14 includes a host operating system (O/S) 60 that provides interfaces to underlying hardware including the connection(s) to the LAN 12, as well as other services as is generally known. A cluster infrastructure component (CLUSTER INFSTR) 62 provides a variety of cluster-related functionality, described in pertinent part below, using one or more logical connections 64 to other cluster members. Virtualization is provided through use of containers 66 which are special forms of virtual machines. In particular, a container 66 is a virtual machine having an instance of an operating system that is the same as the underlying host operating system 60. Thus, in the event that the host operating system 60 is Linux, for example, then the container 66 also executes an instance of Linux (which may be tailored for use as the O/S of a container 66 rather than for use as the O/S of a physical host). A container can be seen as an abstraction layer, providing an abstracted O/S interface to the service application program (SVC APP) 68 using the underlying real operating system 60. The service application program 68 uses the underlying cluster infrastructure 62 and O/S 60, via the container 66, to perform necessary functions for the service, such as network communications, access to the system resources 20, etc. In one embodiment, service application program 68 may be a file access service.

One important function provided by the cluster infrastructure 62 is a mechanism for regular inter-node signaling, commonly referred to as a "heartbeat". This signaling can be monitored by all cluster nodes to monitor for possible failures of other cluster members, enabling appropriate adjustment in cluster operation to be made. In the present context, a cluster member serving as the secondary node 14-S monitors this regular signaling from the primary node 14-P. When this signaling is not detected for some predetermined sufficiently long interval, the secondary node 14-S concludes that the primary node 14-P has failed and that it is necessary for the secondary node 14-S to assume primary responsibility for providing the service.

FIG. 7 illustrates a system configuration employing nodes 14 according to FIG. 6. In this system, initiating operation of the service at the secondary node 14-S is accomplished in part by transferring or "migrating" the container 66 for service application 68 from the primary node 14-P to the secondary node 14-S. This is normally done using storage 70 accessible to each node 14. Generally, migration involves the transfer of data structures that constitute the container 66 as executing in the primary node 14-P. First these are stored from the primary node 14-P to the storage 70. Depending on the migration scenario, this storing operation may be performed in different ways. In the case of dynamic transfer of service responsibility from the primary node 14-P to the secondary node 14-S, the container 66 on the primary node 14-P may be stored at regular intervals during normal operation, so that operation at the secondary node 14-S can commence beginning with a state of the system as at the most recent storing. Migration may be used in other circumstances, as mentioned below, in which it may be acceptable for a system administrator to induce the storing of the container 66 as a one-time operation.

The second part of migration involves initiating execution of the container 66 on the secondary node 14-S. First the container data structures stored in storage 70 are read into the secondary node 14-S, then the container 66 and service application 68 are re-started on the secondary node 14-S. At this point, the container 66 is to make use of the LAN connectivity of the secondary node 14-S rather than that of the primary node 14-P, and the absence of correct connectivity can result in service disruption as explained above. At this point, the secondary node 14-S can conduct the process of FIG. 5 to determine whether connectivity is correct or whether there may be a connectivity problem, in which case prompt remedial action is initiated to minimize service disruption.

As mentioned above, the migration process may be used under different circumstances in which certain aspects may be performed differently. The scenario described above may be referred to as a "failover" scenario, in which one node 14 dynamically takes over the operations of another node 14 that has failed. This operation can be viewed as a form of redundancy for achieving higher availability. Other scenarios may be more controlled, such as an expansion or upgrade involving the addition or replacement of nodes 14 in the system 10. In some cases, the container 66 may be moving to a new node 14 while the existing node 14 (e.g., node 14-P) continues to function. Alternatively, the new node 14 may be a replacement for the existing node 14. In these situations, an administrator may use an administrative migration process including an administrator-commanded storing of the container 66 to the storage 70, followed by administrator-controlled restarting of the container 66 and service 68 on the new node.

It should be noted that the ARP command used for testing network connectivity as described above may also provide information for other purposes. It is possible to measure the round-trip time from the issuance of an ARP command to the receipt of the corresponding response. In a large LAN 12, there may be measurable differences in round-trip times from different nodes 14 to the gateway 16. Round-trip times obtained from ARP command/response pairs can be used in a process of selecting which node 14 should serve as primary node. For example, the node 14 having the lowest measured round-trip time might be selected, on the basis that this reflects a more direct path through the LAN 12 than that used by other nodes 14.

Also, although the above description refers to the use of ARP specifically, there may be other layer-2 protocols having analogous "ping" functionality that can be used instead ARP.

One example of a commercial product that may provide organization and functionality as described herein is a storage product known as VNXe™ sold by EMC Corporation.

While various embodiments of the invention have been particularly shown and described, it will be understood by those skilled in the art that various changes in form and details may be made therein without departing from the scope of the invention as defined by the appended claims.

What is claimed is:

1. A method of operating a secondary computer in a networked system providing a network service using a set of computers including the secondary computer and a primary computer, the system including a local network segment connected to a gateway via which users of the network service communicate with the system, comprising:
   upon assuming responsibility from the primary computer for providing the network service, issuing an address resolution protocol command on a network interface of the secondary computer, the address resolution protocol command being a broadcast command including a network address of the gateway;
   monitoring for receipt of an expected response to the address resolution protocol command, the expected response including the network address of the gateway as well as a data-link-layer address of the gateway on the network segment; and
   in the event of not receiving the expected response to the address resolution protocol command, initiating a remedial action including investigating and/or repairing a potential non-connection of the secondary computer to the local network segment.

2. A method according to claim 1, further including, in the event of receiving the expected response, initiating and responding to network traffic via the gateway and network segment using a network address associated with the network service.

3. A method according to claim 1, wherein the local network segment includes a network switch having ports and switching circuitry, respective ports connected to the primary and secondary computers and the gateway, the switching circuitry being configurable by a separate station management or administration station to provide forwarding of data-link-layer messages among network nodes connected to the network segment, and wherein the initiating includes an indication of a possible mis-configuration of the switch.

4. A method according to claim 1, wherein the system is a network-attached storage system and the service includes operations of a network file system on user-visible storage volumes defined on underlying storage resources of the system.

5. A method according to claim 1, wherein the computers of the set of computers are host machines providing virtual computing functions in the form of containers as virtual machines, each container running an instance of an operating system of the same type as an operating system of the host machine on which the container is running, and wherein the secondary computer assumes responsibility for the service from the primary computer by a migration operation including (1) storing a copy of a container executing on the primary computer to a storage device, (2) retrieving the copy of the container from the storage device into memory of the secondary computer, and (3) restarting execution of the container on the secondary computer.

6. A method according to claim 1, wherein the set of computers employ a distributed clustering infrastructure to manage and operate cluster-related functionality of the system.

7. A method according to claim 6, wherein the cluster-related functionality includes exchange of signaling messages at regular intervals enabling each computer of the system to detect, by an absence of the signaling messages from one of the computers, that the one computer may have failed, and wherein the secondary computer responds to an absence of the signaling messages from the primary computer to assume the responsibility for providing the network service.

8. A computer usable as a secondary computer in a networked system providing a network service using a set of computers including the secondary computer and a primary computer, the system including a local network segment connected to a gateway via which users of the network service communicate with the system, the computer comprising:
   instruction processing circuitry;
   memory;
   input/output circuitry; and
   one or more data busses interconnecting the instruction processing circuitry, memory and input/output circuitry for data transfer,
   wherein the memory stores computer program instructions which, when executed by the instruction processing circuitry, cause the computer to perform a method including:
      upon assuming responsibility from the primary computer for providing the network service, issuing an address resolution protocol command on a network interface of the secondary computer, the address resolution protocol command being a broadcast command including a network address of the gateway;
      monitoring for receipt of an expected response to the address resolution protocol command, the expected response including the network address of the gateway as well as a data-link-layer address of the gateway on the network segment; and
      in the event of not receiving the expected response to the address resolution protocol command, initiating a remedial action including investigating and/or repairing a potential non-connection of the secondary computer to the local network segment.

9. A computer according to claim 8, wherein the method further includes, in the event of receiving the expected response, initiating and responding to network traffic via the gateway and network segment using a network address associated with the network service.

10. A computer according to claim 8, wherein the local network segment includes a network switch having ports and switching circuitry, respective ports connected to the primary and secondary computers and the gateway, the switching circuitry being configurable by a separate station management or administration station to provide forwarding of data-link-layer messages among network nodes connected to the network segment, and wherein the initiating includes an indication of a possible mis-configuration of the switch.

11. A computer according to claim 8, wherein the system is a network-attached storage system and the service includes operations of a network file system on user-visible storage volumes defined on underlying storage resources of the system.

12. A computer according to claim 8, wherein the computers of the set of computers are host machines providing virtual computing functions in the form of containers as virtual machines, each container running an instance of an operating system of the same type as an operating system of the host machine on which the container is running, and wherein the secondary computer assumes responsibility for the service from the primary computer by a migration operation including (1) storing a copy of a container executing on the primary computer to a storage device, (2) retrieving the copy of the container from the storage device into memory of the secondary computer, and (3) restarting execution of the container on the secondary computer.

13. A computer according to claim 8, wherein the set of computers employ a distributed clustering infrastructure to manage and operate cluster-related functionality of the system.

14. A computer according to claim 13, wherein the cluster-related functionality includes exchange of signaling messages at regular intervals enabling each computer of the system to detect, by an absence of the signaling messages from one of the computers, that the one computer may have failed, and wherein the secondary computer responds to an absence of the signaling messages from the primary computer to assume the responsibility for providing the network service.

* * * * *